(12) United States Patent
Li

(10) Patent No.: US 8,287,630 B2
(45) Date of Patent: Oct. 16, 2012

(54) GREASE WATER SEPARATION APPARATUS FOR INDOOR GRILL

(76) Inventor: Wen-Li Li, Niaosong Township (TW)

( * ) Notice: Subject to any disclaimer, the term of this patent is extended or adjusted under 35 U.S.C. 154(b) by 311 days.

(21) Appl. No.: 12/830,284

(22) Filed: Jul. 2, 2010

(65) Prior Publication Data
US 2012/0000839 A1    Jan. 5, 2012

(51) Int. Cl.
*B01D 47/00*    (2006.01)
(52) U.S. Cl. ............ 96/234; 96/262; 96/265; 96/272; 96/273; 96/275; 96/322; 96/323; 96/355; 96/356; 96/357; 96/361; 126/299 R; 126/299 F; 55/DIG. 36
(58) Field of Classification Search ............ None
See application file for complete search history.

(56) References Cited

U.S. PATENT DOCUMENTS

| | | | |
|---|---|---|---|
| 3,643,623 A * | 2/1972 | Eng et al. | 95/29 |
| 5,599,508 A * | 2/1997 | Martinelli et al. | 422/169 |
| 5,756,047 A * | 5/1998 | West et al. | 422/37 |
| 6,019,819 A * | 2/2000 | Williams | 95/206 |
| 7,077,892 B2 * | 7/2006 | Lee | 96/250 |
| 2010/0242737 A1* | 9/2010 | Liu | 96/233 |

* cited by examiner

*Primary Examiner* — Duane Smith
*Assistant Examiner* — Pankti Patel

(57) ABSTRACT

A grease water separation apparatus includes an air chamber in communication with an indoor grill; a water scattering member comprising a space in communication with the air chamber, at least one sprinkling duct, and a pump in communication with the sprinkling duct; a heat exchanger connected to the water scattering member and comprising a grease filter and grease holes; a liquid collector connected to the heat exchanger and comprising a water reservoir in communication with the pump, a grease reservoir for collecting grease from the grease holes, and a grease water mixing reservoir; a water-grease separator connected to the heat exchanger and being in communication therewith, the water-grease separator comprising a hollow cylinder having an air outlet and an inlet within the water-grease separator, and a water-grease outlet for flowing water and grease to the grease water mixing reservoir; a centrifugal fan; and an air filter.

5 Claims, 6 Drawing Sheets

GREASE WATER SEPARATION APPARATUS FOR INDOOR GRILL

BACKGROUND OF THE INVENTION

1. Field of Invention

The invention relates to filtering apparatus and more particularly to a grease water separation apparatus for an indoor grill with improved characteristics.

2. Description of Related Art

A typical grease water separation apparatus for an indoor grill comprises electrostatic means for initially removing airborne grease, smoke, heat, etc. from rising gases, washing means for lowering temperature of the rising gases and mixing therewith, and an eccentric separator for separating water and grease from the mixture. Finally, the rising gases exit externally of the kitchen.

However, the conventional grease water separation apparatus suffers from a number of disadvantages. For example, its efficiency is low. Some combustion products may adhere to an inner surface of the range hood to form sticky dirt. Thus, a frequent cleaning of the range hood is required. Further, odors are substantially not removed from the rising gases. This can contaminate the environment. Thus, the need for improvement still exists.

SUMMARY OF THE INVENTION

It is therefore one object of the invention to provide a grease water separation apparatus for an indoor grill comprising an air chamber being in communication with the indoor grill; a water scattering member comprising an internal space in communication with the air chamber, at least one sprinkling duct, and a pump in communication with the at least one sprinkling duct; a heat exchanger connected to the water scattering member and being in communication with the space of the water scattering member, the heat exchanger comprising a grease filter including a plurality of filter elements and a plurality of grease holes; a liquid collector connected to the heat exchanger and comprising a water reservoir in communication with the pump, a grease reservoir for collecting grease from the grease holes, and a grease water mixing reservoir; a water-grease separator connected to the heat exchanger and being in communication therewith, the water-grease separator comprising a hollow cylinder having one end formed as an air outlet and an inlet at the other end within the water-grease separator, and a bottom water-grease outlet for flowing water and grease to the grease water mixing reservoir; a motor driven centrifugal fan being in communication with the air outlet; and an air filter being in communication with the centrifugal fan and comprising a filter unit, wherein in an operation rising gases from the indoor grill is directed into the space of the water scattering member via the air chamber, water in the water reservoir is drawn to the at least one sprinkling duct by the pump and impinged into the space of the water scattering member in form of vapor by the at least one sprinkling duct, the vapor is mixed with the gases prior to entering the heat exchanger, grease of the mixture is substantially removed by the filter elements and flows into the grease reservoir via the grease holes, vapor of the mixture is directed to the water-grease separator to circulate around the cylinder so that a centrifugal force is generated to separate water and remaining grease from the vapor of mixture, the separated water and grease are impinged on an inner wall of the water-grease separator prior to flowing to the grease water mixing reservoir via the grease water mixing reservoir, air in the cylinder is sucked into the air filter by the centrifugal fan, and the air is filtered by the air filter prior to exiting.

The above and other objects, features and advantages of the invention will become apparent from the following detailed description taken with the accompanying drawings.

DETAILED DESCRIPTION OF THE INVENTION

Figure 1:
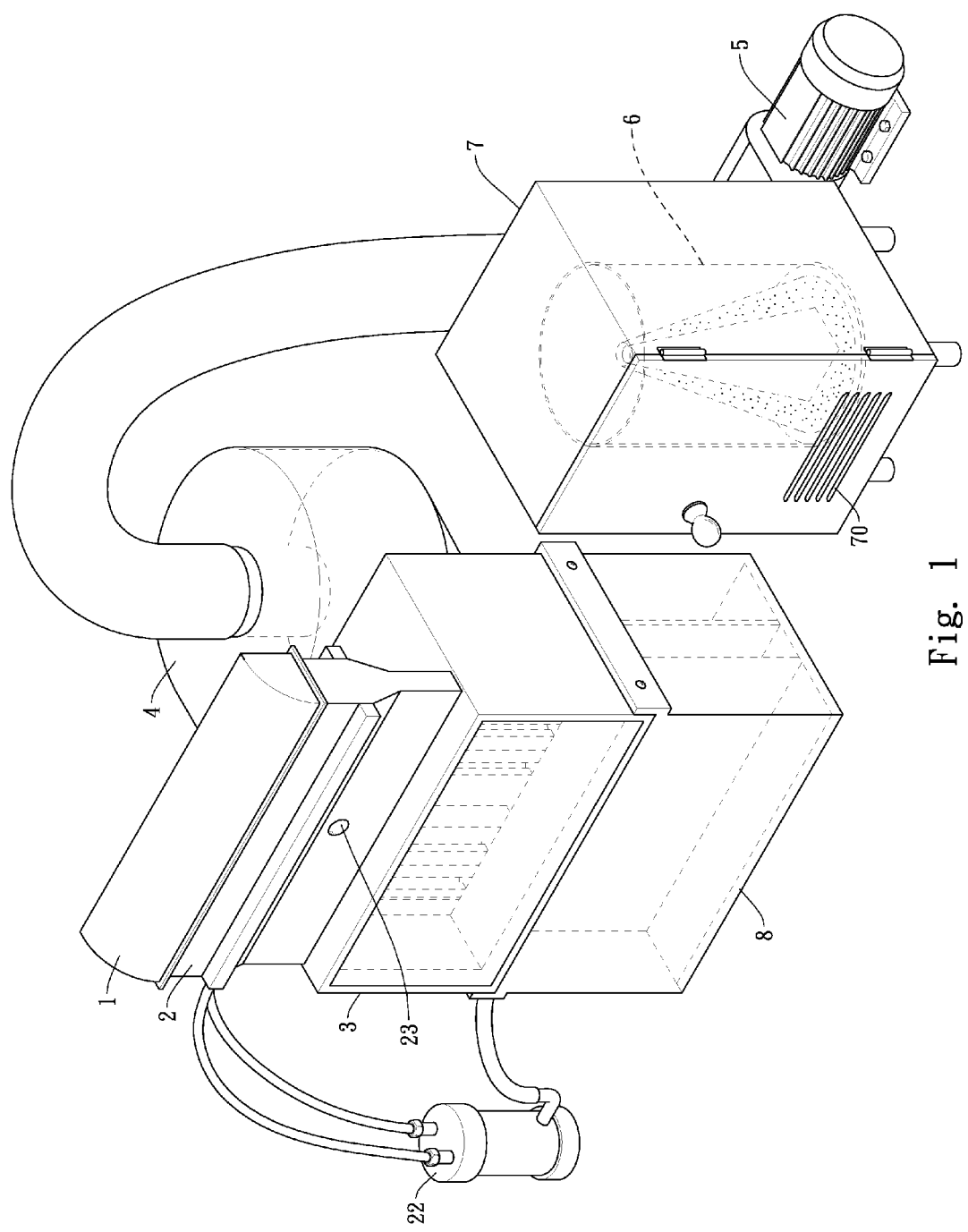
FIG. 1 is a perspective view of a grease water separation apparatus for an indoor grill according to the invention.
Figure 2:
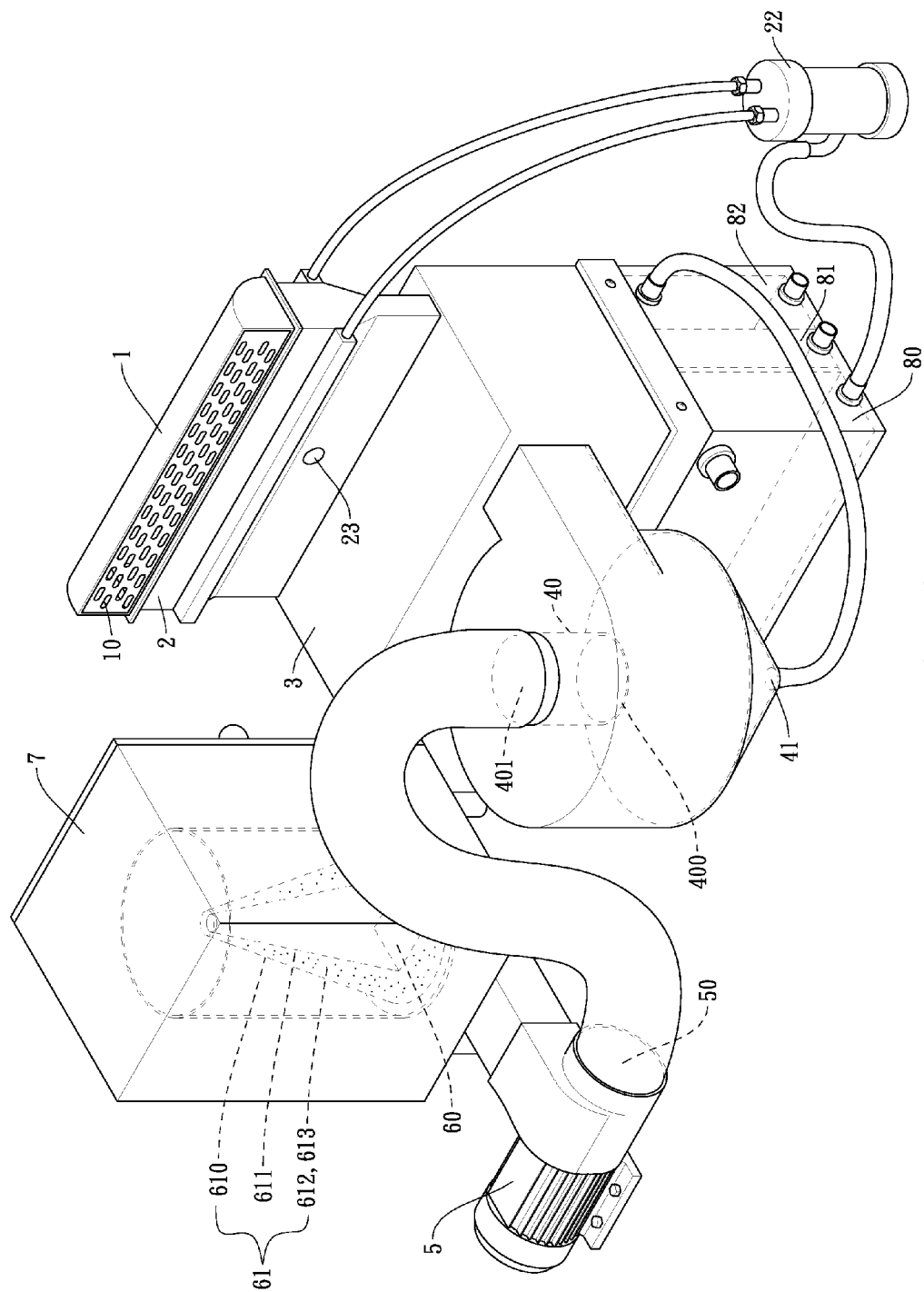
FIG. 2 is another perspective view of the grease water separation apparatus in FIG. 1.
Figure 3:
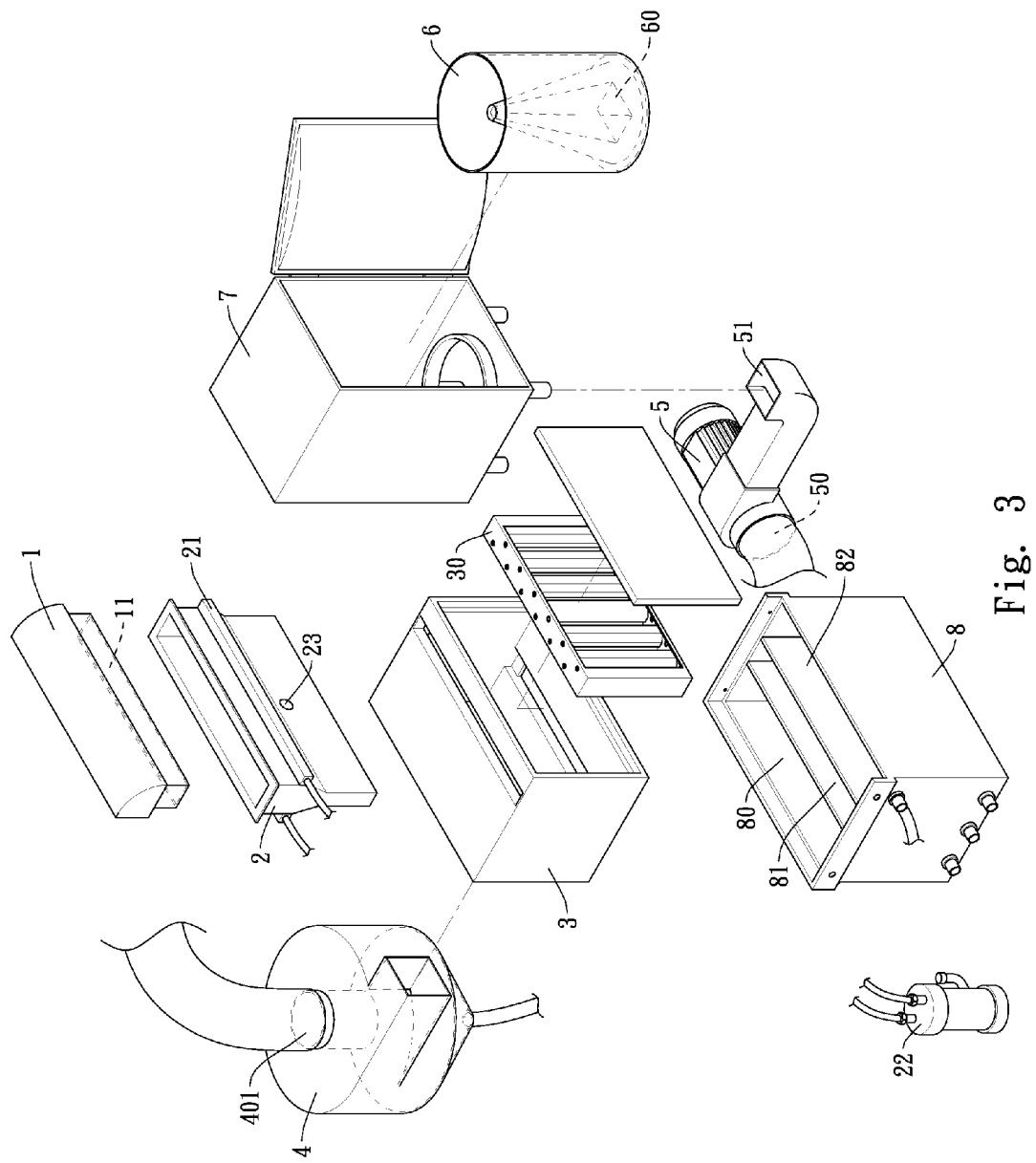
FIG. 3 is an exploded view of the grease water separation apparatus.
Figure 4:
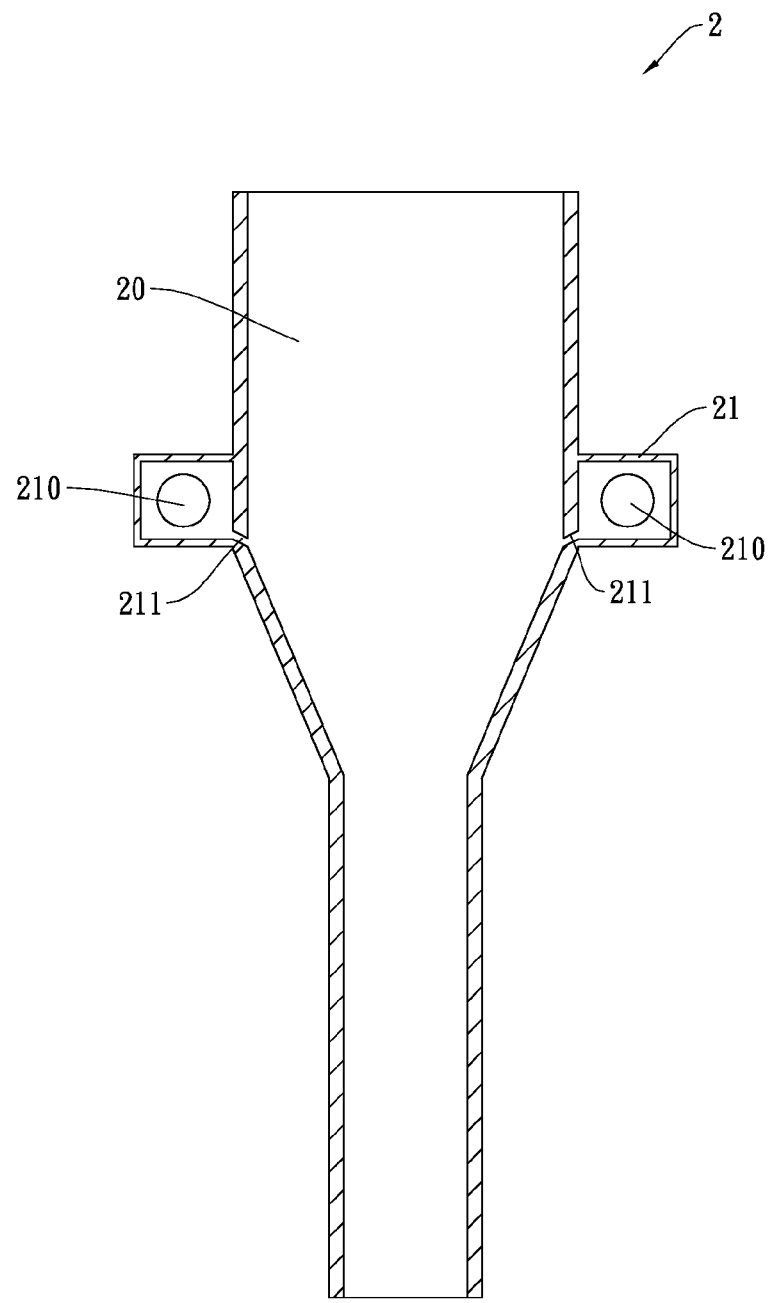
FIG. 4 is a longitudinal sectional view of the water scattering member.
Figure 5:
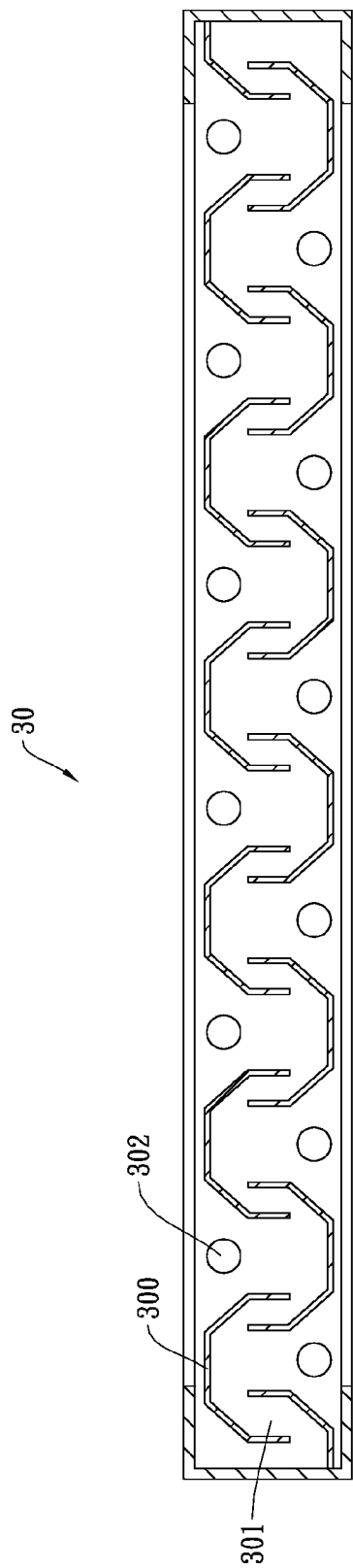
FIG. 5 is a cross-sectional view of the grease filter.

Referring to FIGS. 1 to 5, a grease water separation apparatus for indoor grill in accordance with the invention comprises the following components as discussed in detail below.

An air chamber 1 comprises a plurality of air inlets 10 at one end and an air outlet 11 at the other end.

A water scattering member 2 comprises an internal space 20 of rectangular cross-section in communication with the air outlet 11, the space 20 being tapered toward a lower portion for directing water, a sprinkling duct 21 on either side of the space 20, each sprinkling duct 21 having an inlet 210 in communication with a line connecting to a pump 22 and a nozzle 211 in communication with the space 20, and a window 23 on either side of the space 20 of the water scattering member 2 for inspection.

A box shaped heat exchanger 3 is mounted below the space 20 of the water scattering member 2 and comprises a grease filter 30 including a plurality of filter elements 300 arranged horizontally in alternating fashion in opposing directions, a plurality of outlets 301 each formed between edges of the opposite filter elements 300, and a plurality of grease holes 302 on each of top and bottom surfaces.

A box shaped liquid collector 8 is mounted below the heat exchanger 3 and has an internal space divided into a water reservoir 80 filled with clean water and being in communication with both the pump 22 via a line and a large water tank (not shown) as water source via another line, a grease reservoir 81 for collecting grease from the grease holes 302, and a grease water mixing reservoir 82 being in communication with a purification device (not shown) for removing grease from water.

A substantially cylindrical shaped water-grease separator 4 is mounted on side of the heat exchanger 3 and comprises a hollow cylinder 400 having one end open to a top as an air outlet 401 and the other end open to about center of the hollow of the water-grease separator 4 as an inlet 400, and a water-grease outlet 41 at a bottom end of a funnel shaped lower portion of the water-grease separator 4 for flowing water and grease to the grease water mixing reservoir 82 via a line.

A centrifugal fan 5 comprises an inlet 50 in communication with the air outlet 401 via a line, and an outlet 51.

A hollow cylindrical air filter 6 comprises a filter unit 61 including a conic inner mesh 611 having a bottom opening as an inlet 60 which is in communication with the outlet 51, a conic outer mesh 610, a space 612 defined between the inner and outer meshes 611 and 610, and activated charcoal 613 filled in the space 612. An elevated noise reduction box 7 is put on the air filter 6 for reducing the amount of noise emitted by the gases. A plurality of outlets 70 are provided on one side of the noise reduction box 7 for exiting cleaned air.

Figure 6:
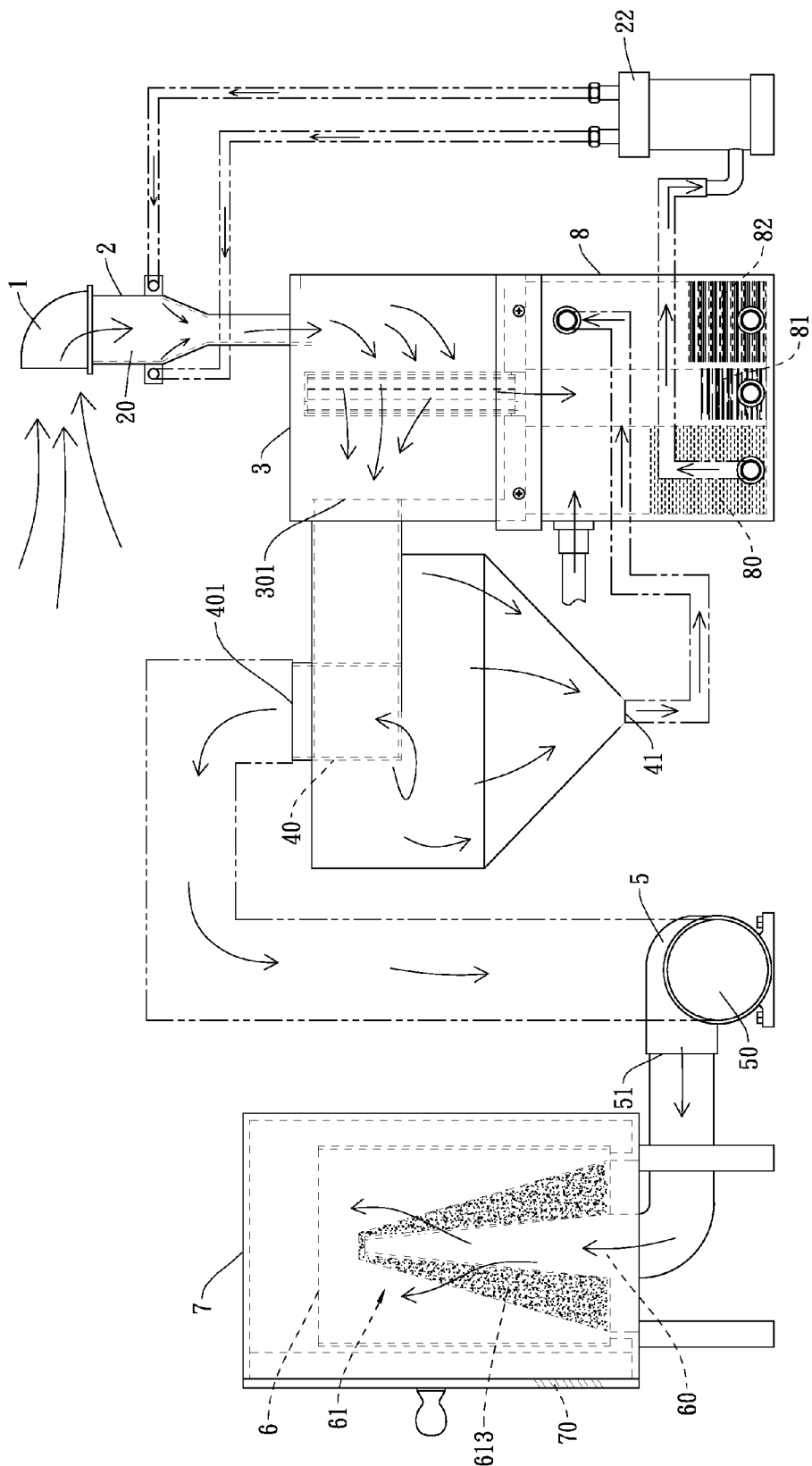
FIG. 6 is an elevational view of the water scattering member in FIG. 2 showing an operation.

Referring to FIG. 6, an operation of the grease water separation apparatus is described in detail below. Rising gases from an indoor grill is directed into the air chamber 1 via the air inlets 10. And in turn, the rising gases are directed to the space 20 via the air outlet 11. At the same time, water in the water reservoir 80 is drawn to the sprinkling ducts 21 by the pump 22. Water is next in the form of fine particles (i.e., vapor) directing into the space 20 via the high velocity nozzles 211. Temperature of the rising gases is thus lowered by the cool water. Vapor is mixed with the gases prior to entering the heat exchanger 3. A substantial percentage of grease and combustion products of the mixture is removed by the filter elements 300 and flows into the grease reservoir 81 via the grease holes 302. The grease and liquid in the grease reservoir 81 will be drained when the grease reservoir 81 is full. Also, vapor of the mixture is directed to the water-grease separator 4 via the outlets 301. The pressurized vapor is circulated around the cylinder 40 to create a centrifugal force for separating water and remaining grease from the vapor. The separated water and grease are impinged on an inner wall of the water-grease separator 4 prior to flowing into the grease water mixing reservoir 82 via the water-grease outlet 41. Next, the water and grease leave the grease water mixing reservoir 82 to the purification device for removing grease from water (i.e., for recycling purposes). Air in the cylinder 40 is sucked into the inlet 50 by the centrifugal fan 5 via the air outlet 401. And in turn, the centrifugal fan 5 forces air into the air filter 6 via the outlet 51 and the inlet 60. Odors and smoke particles in the air are removed by the activated charcoal 13. Finally, cleaned air is releasing to the outside.

While the invention has been described in terms of preferred embodiments, those skilled in the art will recognize that the invention can be practiced with modifications within the spirit and scope of the appended claims.

What is claimed is:

1. A grease water separation apparatus for an indoor grill comprising:
   an air chamber being in communication with the indoor grill;
   a water scattering member comprising an internal space in communication with the air chamber, at least one sprinkling duct, and a pump in communication with the at least one sprinkling duct;
   a heat exchanger connected to the water scattering member and being in communication with the space of the water scattering member, the heat exchanger comprising a grease filter including a plurality of filter elements and a plurality of grease holes;
   a liquid collector connected to the heat exchanger and comprising a water reservoir in communication with the pump, a grease reservoir for collecting grease from the grease holes, and a grease water mixing reservoir;
   a water-grease separator connected to the heat exchanger and being in communication therewith, the water-grease separator comprising a hollow cylinder having one end formed as an air outlet and an inlet at the other end within the water-grease separator, and a bottom water-grease outlet for flowing water and grease to the grease water mixing reservoir;
   a motor driven centrifugal fan being in communication with the air outlet; and
   an air filter being in communication with the centrifugal fan and comprising a filter unit,
   wherein in an operation rising gases from the indoor grill is directed into the space of the water scattering member via the air chamber, water in the water reservoir is drawn to the at least one sprinkling duct by the pump and impinged into the space of the water scattering member in form of vapor by the at least one sprinkling duct, the vapor is mixed with the gases prior to entering the heat exchanger, grease of the mixture is substantially removed by the filter elements and flows into the grease reservoir via the grease holes, vapor of the mixture is directed to the water-grease separator to circulate around the cylinder so that a centrifugal force is generated to separate water and remaining grease from the vapor of mixture, the separated water and grease are impinged on an inner wall of the water-grease separator prior to flowing to the grease water mixing reservoir via the grease water mixing reservoir, air in the cylinder is sucked into the air filter by the centrifugal fan, and the air is filtered by the air filter prior to exiting.

2. The grease water separation apparatus of claim 1, further comprising at least one window on the water scattering member.

3. The grease water separation apparatus of claim 1, wherein the filter unit is activated charcoal.

4. The grease water separation apparatus of claim 1, wherein the filter elements are arranged horizontally in alternating fashion in opposing directions.

5. The grease water separation apparatus of claim 1, further comprising an elevated noise reduction box put on the air filter.

* * * * *